United States Patent
Roffey et al.

[15] 3,691,160
[45] Sept. 12, 1972

[54] 4-HYDRAZONOMETHYLTHIAZOLE ANTITRYPANOCIDES

[72] Inventors: Patrick Roffey, Camerley; John Pomfret Verge, Henley-on-Thames, both of England

[73] Assignee: Lilly Industries, Ltd., London, England

[22] Filed: July 8, 1970

[21] Appl. No.: 53,305

[30] Foreign Application Priority Data

July 15, 1969 Great Britain..........35,593/69
April 20, 1970 Great Britain..........18,801/70

[52] U.S. Cl..............260/240 A, 424/246, 424/248, 424/249, 424/267, 424/270, 260/243 R, 260/247.1, 260/248.5, 260/293.69, 260/294.8, 260/302 H, 260/306.8 R, 260/240.1

[51] Int. Cl. .............................................C07d 91/32

[58] Field of Search..........260/240 A, 240.1, 302 H, 260/243 R, 247.1, 284.5, 263.69, 294.8

[56] References Cited

UNITED STATES PATENTS 3,158,623  11/1964  Von Esch et al.......260/302 H
3,470,164  9/1969   Takamatsu et al.....260/240 A
3,491,091  1/1970   Berger et al. ..........260/240 A Primary Examiner—John D. Randolph
Attorney—Everet F. Smith and Walter E. Buting

[57] ABSTRACT 2-(5-Nitro-2-furyl)-, 2-(5-nitro-2-thienyl)-, 2-[2-(5-nitro-2-furyl)vinyl]-, and 2-[2-(5-nitro-2-thienyl)vinyl]-4-hydrazonomethylthiazoles trypanocidally active compounds are prepared by reacting the corresponding 4-($C_1$-$C_7$ alkanoyl)thiazole with a hydrazine of the formula:

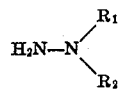

wherein $R_1$ and $R_2$ separately are H, $C_1$-$C_6$ alkyl, $C_1$-$C_6$ hydroxyalkyl, $C_1$-$C_6$ alkoxyalkyl and $R_1$ and $R_2$ together are alkylene, oxaalkylene, thiaalkylene, thiaoxyalkylene, thiadioxyalkylene or azaalkylene bridge.

12 Claims, No Drawings

4-HYDRAZONOMETHYLTHIAZOLE ANTITRYPANOCIDES

SUMMARY

This invention relates to disubstituted thiazole compounds and to intermediates useful for the preparation thereof. In one of its aspects, this invention relates to antitrypanosomal-4-hydrazonomethylthiazole compounds represented by the following general Formula I

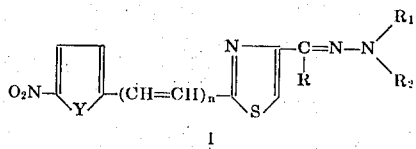

I wherein Y is O or S, $n$ is 0 or 1, R is hydrogen or $C_1$–$C_6$ alkyl, $R_1$ and $R_2$ when taken separately are hydrogen, $C_1$–$C_6$ alkyl, $C_1$–$C_6$ hydroxyalkyl or $C_1$–$C_6$ alkoxyalkyl, and $R_1$ and $R_2$ when taken together represent a four-membered alkylene bridge or a five-membered or six-membered alkylene, oxaalkylene, thiaalkylene thioxyalkylene, thiadioxyalkylene or azaalkylene bridge optionally substituted on one or more members thereof by $C_1$–$C_4$ lower alkyl, $C_1$–$C_4$ lower hydroxyalkyl or hydroxy such that $R_1$ and $R_2$ together with the nitrogen atom to which they are attached form a five- to seven-membered heterocyclic ring.

In another of its aspects, this invention relates to the novel intermediate 4-formyl or 4-alkanoylthiazoles represented by the Formula II

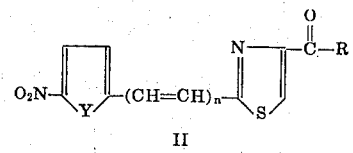

II wherein R is hydrogen or $C_1$–$C_6$ alkyl. The compounds of Formula I are prepared by reacting a compound of Formula II with a disubstituted hydrazine represented by the formula

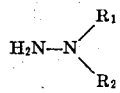

wherein $R_1$ and $R_2$ have the same meanings as previously assigned.

In yet another of its aspects, this invention relates to the useful intermediates employed in the preparation of the 4-formylthiazoles of Formula II. The 4-formylthiazoles are prepared by the reaction of a 5-nitro-2-furyl(2-thienyl)thiocarboxamide or a 5-nitro-2-vinylthiocarbamyl furan (thiophene) with 1,3-dichloroacetone to obtain the corresponding 4-chloromethylthiazole according to the following equation:

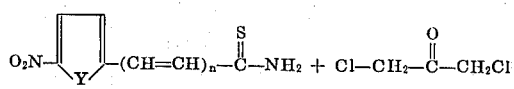

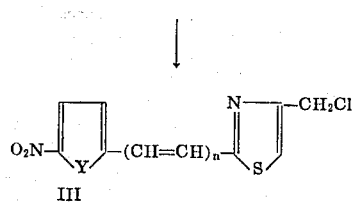

III wherein Y and $n$ are as previously defined.

The 4-chloromethylthiazole of the Formula III is reacted with a tertiary amine such as pyridine or hexamethylenetetramine (hexamine) to form the novel quaternary ammonium methyl thiazole of the Formula IV

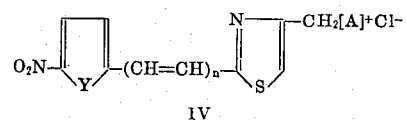

IV wherein A is pyridinium or hexamethylenetetraminium (hexaminium) and Y and $n$ are as previously defined.

The pyridinium halide of Formula IV on reaction with p-nitroso-N,N-dimethylaniline yields an intermediate nitrone which upon hydrolysis as known in the art affords the 4-formylthiazole of Formula II wherein R is H. The hexaminium halide of Formula IV affords the 4-formylthiazole on hydrolysis under acid conditions according to the well-known Sommelet reaction.

The 4-alkanoylthiazole compounds of Formula II are prepared by the reaction of a 5-nitro-2-furyl(2-thienyl)thiocarboxamide or a 5-nitro-2-vinylthiocarbamylfuran (thiophene) with an α-halo diketone according to the following equation.

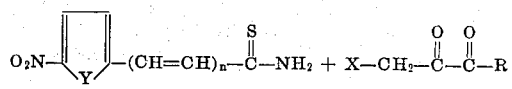

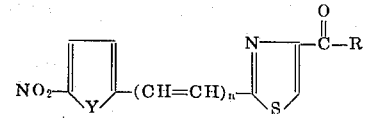

wherein Y, $n$ and R have the same meanings as previously assigned and X is chloro or bromo.

The compounds of the present invention represented by the Formula I are valuable antiparasitic agents, active in vivo against mammalian parasites, in particular the various species of Trypanosomidae, for example, *Trypanosoma cruzi*, *Trypanosoma Rhodesiense*, and *Trypanosoma Gambiense*. The compounds are also active in vitro against fungi and bacteria.

DETAILED DESCRIPTION

The novel antitrypanosome compounds of the present invention are characterized structurally by a thiazole ring substituted in the 4-position by hydrazonomethyl moiety and in the 2-position by a 5-nitrofuryl or 5-nitrothienyl moiety linked either directly to the thiazole ring or indirectly through a vinyl group.

The compounds are represented by the following structural Formula I

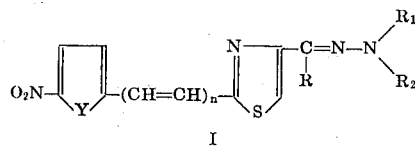

I wherein Y is O or S, $n$ is 0 or 1, R is hydrogen or $C_1$–$C_6$ alkyl, $R_1$ and $R_2$ when taken separately are hydrogen, $C_1$–$C_6$ alkyl, $C_1$–$C_6$ hydroxyalkyl or $C_1$–$C_6$ alkoxyalkyl, and $R_1$ and $R_2$ when taken together represent a four-membered alkylene bridge or a five-membered or six-membered alkylene, oxaalkylene, thiaalkylene, thiaoxyalkylene, thiadioxyalkylene or azaalkylene bridge optionally substituted on one or more member thereof by $C_1$–$C_4$ lower alkyl $C_1$–$C_4$ lower hydroxyalkyl or hydroxy such that $R_1$ and $R_2$ together with the nitrogen atom to which they are attached from a five- to seven-membered heterocyclic ring.

The term $C_1$–$C_6$ alkyl refers to straight or branched hydrocarbon chains such as methyl, ethyl, n-propyl, iso-propyl, n-butyl, sec-butyl, iso-butyl, n-amyl, sec-amyl, n-hexyl and the like. $C_1$–$C_6$ Hydroxyalkyl refers to the $C_1$–$C_6$ alkylmonohydroxy substituted hydrocarbon chains such as hydroxymethyl, 2-hydroxyethyl, 3-hydroxypropyl, 4-hydroxybutyl, 3-hydroxybutyl, 5-hydroxypentyl, 6-hydroxyhexyl, 3-hydroxyhexyl and the like. The term "$C_1$–$C_6$ alkoxyalkyl" refers to the $C_1$–$C_6$ alkyl hydrocarbon chains substituted by a $C_1$–$C_4$ lower alkoxy group and includes methoxy-methyl, ethoxymethyl, 2-ethoxyethyl, 4-methoxybutyl, 6-methoxyhexyl, 3-n-butoxypropyl, 2-isopropoxyethyl and the like.

When in the above Formula I, $R_1$ and $R_2$ are taken together with the nitrogen atom to which they are attached to form a five to seven membered heterocyclic ring, such heterocyclic rings as pyrrolidine, piperidine, morpholine, thiomorpholine, homopiperidine, piperazine and like heterocyclics, optionally substituted by $C_1$–$C_4$ lower alkyl, $C_1$–$C_4$ lower hydroxyalkyl or hydroxy, are representative of those described by the definition.

The following compounds are representative of the 4-hydrazonomethylthiazoles represented by the Formula I:

2-(5-nitro-2-thienyl)-4-formylthiazole hydrazone,
2-(5-nitro-2-furyl)-4-formylthiazole hydrazone,
2-(5-nitro-2-thienyl)-4-acetylthiazole-N-ethyl-hydrazone,
2-(5-nitro-2-thienyl)-4-propionylthiazole-N,N-diethyl-hydrazone,
2-(5-nitro-2-furyl)-4-acetylthiazole-N,N-di-n-butyl hydrazone,
2-[2-(5-nitro-2-thienyl)vinyl]-4-formylthiazole-N,N-di-(2-hydroxyethyl)hydrazone,
2-[2-(5-nitro-2-thienyl)vinyl]-4-formylthiazole-N,N-di-(2-hydroxyethyl)hydrazone,
2-[2-(5-nitro-2-furyl)vinyl]-4-butyrylthiazole-N,N-di-(2-methoxyethyl)hydrazone,
2-(5-nitro-2-furyl)-4-hexanoylthiazole-N,N-di-n-hexylhydrazone,
2-(5-nitro-2-thienyl)-4-formylthiazole-N,N-di-(4-hydroxybutyl)hydrazone,
2-(5-nitro-2-furyl)-4-formylthiazole-N,N-di (4-ethoxy-butyl)hydrazone,
2-(5-nitro-2-furyl)-4-pyrrolidinoiminomethyl)thiazole,
2-(5-nitro-2-thienyl)-4-(1')morpholinoiminoethyl)-thiazole,
2-[2-(5-nitro-2-furyl)vinyl]-4-(morpholinoiminomethyl)-thiazole,
2-[2-(5-nitro-2-thienyl)vinyl]-4-(piperidinoiminomethyl thiazole,
2-(5-nitro-2-thienyl)-4-(1'-piperidinoiminobutyl)-thiazole,
2-(5-nitro-2-furyl)-4(thiamorpholinoiminomethyl)-thiazole,
2-(5-nitro-2-thienyl)-4-(2',6'-dimethyl-morpholinoimino-methyl)thiazole,
2-(5-nitro-2-furyl)-4-(4-ethyl-piperidinoiminomethyl)-thiazole,
2-(5-nitro-2-furyl)-4-(4-methyl-piperazinoiminomethyl)-thiazole,
2-(5-nitro-2-furyl)-4-[4-($\beta$-hydroxyethyl)piperazinoiminomethyl]thiazole,
2-(5-nitro-2-furyl)-4-(homopiperazinoiminomethyl)thiazole,
2-(5-nitro-2-thienyl)-4-[1'-(4-hydroxymethyl-piperidino-imino)propyl]thiazole,
2-[2-(5-nitro-2-thienyl)vinyl]-4-(3-hydroxypiperidinoiminomethyl)thiazole,
2-(5-nitro-2-furyl)-4-(thiomorpholinoiminomethyl)-thiazole 1',1'-dioxide and the like.

The novel 4-hydrazonomethylthiazoles of this invention represented by the Formula I are useful antiparasitic agents. In particular, the hydrazonomethylthiazoles are useful in combating the infectious protozoa, especially the trypanosomes, *Trypanosoma cruzi*, *Trypanosoma rhodesiense*, *Trypanosoma gambiense*, and *Trypanosoma congolense*.

Table I which follows shows the activity of illustrative 4-hydrazonomethylthiazoles against the four trypanosomes mentioned above. The data presented were obtained in the following manner:

Groups of four white mice weighing approximately 17 to 19 g. each were inoculated intraperitoneally with an inoculum containing about 1 million trypanosome organisms in 0.85 percent saline and 2.0 percent sodium citrate solution. The test compound was administered daily for 4 to 5 consecutive days post-infection by intraperitoneal injection, the first daily dose being administered 6 hours after inoculation of the trypanosomes. The activity of the compounds shown in Table I was assessed by determining the survival of test animals and the presence or absence of trypanosomes in the peripheral blood (parasitemia). A test compound is designated as 100 percent active at the dosage employed if all animals survive an arbitrary number of days with a negative parasitemia. In the case of *T. cruzi*, the arbitrary survival time chosen is 60 days. With the other trypanosome species, the survival time is 30 days. Intermediate activity is the extension of survival time of the test group of mice over that of the control group of mice expressed as a percentage. Control groups of mice are inoculated with infectious trypanosomes but are not administered a test compound.

TABLE I

Trypanocidal acitvity of 4-hydrozanomethylthiazoles

| | Trypanosome and activity | | | | | | | |
|---|---|---|---|---|---|---|---|---|
| | *T. cruzi* | | *T. rhodesiense* | | *T. congolense* | | *T. gambiense* | |
| | Dose, mg./kg. ip. | Percent activity | Dose, mg./kg. ip. | Percent activity | Dose, mg./kg. ip. | Percent activity | Dose, mg./kg. i.p. | Percent activity |
| 2-(5-nitro-2-thienyl)-4-(morpholinoiminomethyl)thiazole | 100×5 | 100 | 200×4 | 100 | 200×4 | 38 | 200×4 | 73 |
| 2-(5-nitro-2-furyl)-4-(morpholinoiminomethyl)thiazole | 25×5 | 100 | 200×4 | 80 | 125×4 | 100 | 50×4 | 100 |
| 2-(5-nitro-2-furyl)-4-(piperidinoiminomethyl)thiazole | 50×5 | 100 | 100×4 | 100 | 25×4 | 100 | 50×4 | 85 |

TABLE I — Continued

Trypanocidal acitvity of 4-hydrozanomethylthiazoles

| | Trypanosome and activity | | | | | | | |
|---|---|---|---|---|---|---|---|---|
| | T. cruzi | | T. rhodesiense | | T. congolense | | T. gambiense | |
| | Dose,[1] mg./kg. ip. | Percent activity | Dose, mg./kg. ip. | Percent activity | Dose, mg./kg. ip. | Percent activity | Dose, mg./kg. i.p. | Percent activity |
| 2-(5-nitro-2-furyl)-4-(thiomorpholinoimionmethyl)thiazole | 50×5 | 100 | 50×4 | 100 | 50×4 25×4 | 100 92 | 25×4 | 100 |
| 2-(5-nitro-2-furyl)-4-(thiomorpholinoiminomethyl)thiazole 1',1',-doxide | 100×5 | 100 | 100×4 | 100 | 25×4 | 73 | 25×4 | 100 |

[1] Daily dose in mg./kg. times the number of days of administration.

The 4-hydrazonomethylthiazoles represented by Formula I are effective in combating trypanosome infections in warm blooded mammals when administered parenterally at doses of from about 10 mg./kg. to about 500 mg./kg. of body weight. Those skilled in the art will recognize that the size, frequency and duration of the dose used for treatment will vary, depending upon such factors as the general health of the host, the intensity and extent of the infection as well as the particular species of trypanosome involved.

The trypanocidally effective compounds described herein are relatively non-toxic to mammalian species. The $LD_{50}$ values for the compounds by intraperitoneal injection are greater than 500 mg./kg. For example, the $LD_{50}$ values for the compounds of Table I are all greater than 800 mg./kg. ip.

The compounds represented by Formula I are prepared by the reaction of a 4-formylthiazole or a 4-alkanoylthiazole represented by the Formula II

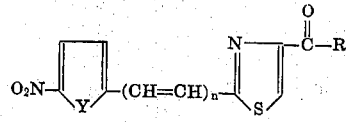

II with a hydrazine of the formula

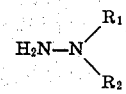

wherein Y, n, R, $R_1$ and $R_2$ have the same meanings as previously assigned in Formula I. The reaction is carried out by heating the 4-formyl or 4-alkanoylthiazole with mixture to appropriate hydrazine in inert solvent such as chloroform or ethylene dichloride or in a solvent combination such as dioxane-chloroform. The reaction solution is generally heated at the reflux temperature of the reaction mixture for about 30 minutes to about 5 hours. The reaction mixture is then cooled to a temperature of about 0° C. and diluted, as, for example, with petroleum ether to induce crystallization of the reaction product. Alternatively, the reaction product can be recovered from the reaction mixture by evaporating the reaction mixture to a lesser volume and then inducing crystallization with petroleum ether or the like.

The 4-formyl and 4-alkanoylthiazoles employed for the synthesis of the 4-hydrazonomethylthiazoles of Formula I are prepared by different synthetic routes.

The 4-formyl thiazoles are prepared by first reacting a 5-nitrofuryl-2-thioamide or 5-nitrothienyl-2-thioamide with 1,3-dichloroacetone to obtain a 4-chloromethylthiazole according to the following equation:

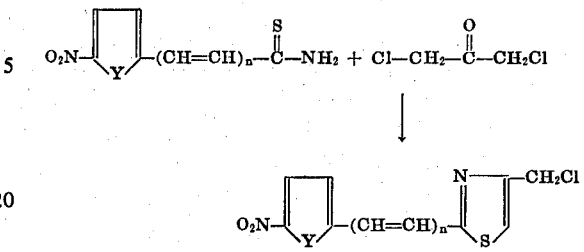

wherein Y is O or S and n is 0 or 1.

The 4-chloromethylthiazole is then reacted with hexamethylen tetramine (hexamine) to form the 4-hexamethylenetetraminium methyl thiazole chloride (hexaminium) which, on hydrolysis under acidic conditions, affords the 4-formylthiazole according to the following equation.

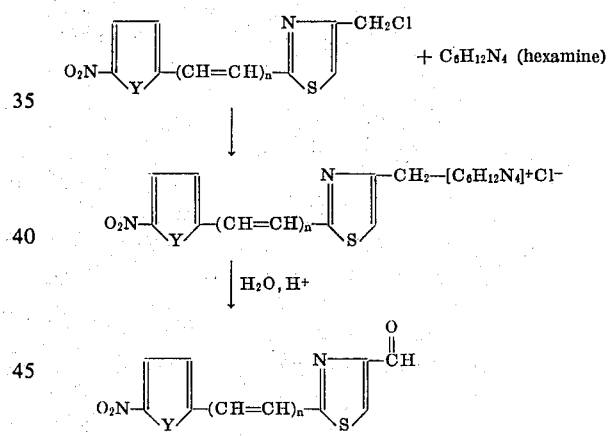

The reaction of the 5-nitrofuryl or 5-nitrothienyl thioamide with the α-haloketone, 1,3-dichloroacetone, is carried out in general according to the procedure frequently described as the Hantzsch thiazole synthesis. The reaction is preferably carried out in refluxing ethanol or in dioxane maintained at a temperature of about 90° C. The reaction product is filtered off, washed and dried. The crude product may be purified by extraction with boiling chloroform, the extract boiled with charcoal, filtered and evaporated until crystallization of the 4-chloromethylthiazole commences.

Alternatively, the 4-formylthiazoles can be prepared by the reaction of the 4-chloromethylthiazole with pyridine to form the pyridinium chloride. The pyridinium halide is reacted with p-nitroso-N,N-dimethylaniline in 2N sodium hydroxide to form a nitrone intermediate represented by the following formula:

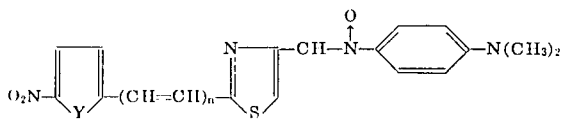

The intermediate nitrone is then hydrolyzed by known procedures in warm aqueous acid to yield the 4-formylthiazole. The hydrolysis is carried out by suspending the nitrone in aqueous hydrochloric acid and warming the suspension on a hot water bath for about 15 minutes. The initially reddish-brown colored nitrone suspension changes to a yellow suspension of the 4-formylthiazole during the hydrolysis. The suspension is filtered and the 4-formylthiazole compound is purified by recrystallization.

Although both of the above described methods for the synthesis of the 4-formylthiazoles useful in this invention are suitable preparative methods, the following method, which can also be used to prepare the 4-alkanoylthiazoles, is the preferred route to the 4-formyl thiazoles.

This method comprises esterifying a 4-haloalkylthiazole of the formula:

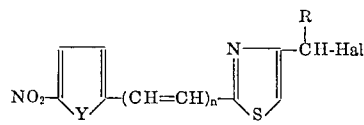

by reaction with an alkali metal salt of a suitable organic carboxylic acid, for example, sodium or potassium acetate, and thereafter hydrolyzing the resultant ester in the presence of a mineral acid such as hydrochloric acid to the corresponding alcohol. The latter on oxidation yields the desired 4-alkanoyl thiazole. The esterification is desirably carried out at elevated temperatures, for example, between 70° and 95° C., and in a suitable reaction solvent such as dimethylformamide. If the halide starting material is a chloro- or bromo- compound, the presence of sodium or potassium iodide in the reaction mixture is advantageous. In the oxidation step, the oxidizing agent is preferably sodium dichromate in glacial acetic acid although other oxidizing agents such as chromium trioxide in sulphuric acid or glacial acetic acid may be used. The foregoing method is particularly useful for the preparation of the 4-formyl thiazoles.

The 4-alkanoylthiazoles wherein R is other than hydrogen are preferably synthesized by the reaction of a 5-nitrofuryl or a 5-nitrothienyl thiocarboxamide with an α-halodiketone according to the following equation:

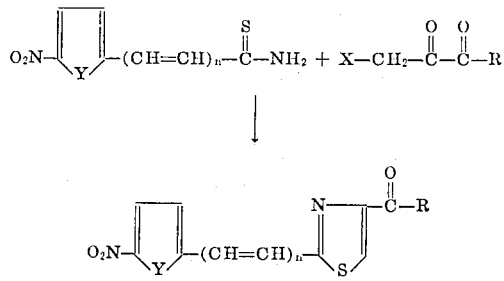

wherein Y is O or S, $n$ is 0 or 1, R is $C_1$–$C_6$ alkyl and X is chloro or bromo.

The reaction is performed by heating the thioamide with the α-halodiketone in an unreactive solvent, for example dioxane, at a temperature of about 60° C. for about 15 to 30 minutes. As the reaction proceeds, hydrogen halide is evolved. Following the heating period the reaction mixture is diluted with water to precipitate the reaction product. The 4-alkanoylthiazole is purified by treatment with charcoal and recrystallization.

α-halodiketones which can be employed for the preparation of the 4-alkanoylthiazoles according to the procedures described in this invention include the following: 1-bromobutan-2,3-dione, 1-chlorobutan-2,3-dione, 1-bromopentan-2,3-dione, 1-bromohexan-2,3-dione, 1-bromo-4-methylpentan-2,3-dione, 1-bromooctan-2,3-dione, 1-chloro-5-methylhexan-2,3-dione and the like.

As can be seen from the foregoing, this invention likewise provides novel 4-substituted thiazole intermediates represented by the Formula V

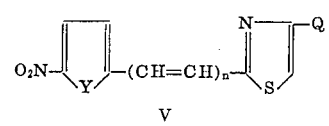

wherein Y is O or S, $n$ is 0 or 1 and Q is $C_1$–$C_7$ alkanoyl, or a quaternary ammonium methyl halide represented by the formula

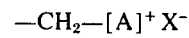

wherein A is pyridinium or hexamethylenetetraminium and X is chloro or bromo.

The following compounds are illustrative of the intermediate 4-alkanoylthiazole compounds of this invention represented by the above Formula V wherein Q is $C_1$–$C_7$ alkanoyl:

2-(5-nitro-2-furyl)-4-formylthiazole,
2-(5-nitro-2-thienyl)-4-formylthiazole,
2-(5-nitro-2-thienyl)-4-acetylthiazole,
2-[2-(5-nitro-2-thienyl)vinyl]-4-propionylthiazole,
2-(5-nitro-2-furyl)-4-hexanoylthiazole,
2-(5-nitro-2-thienyl)-4-sec-butyrylthiazole,
2-[2-(5-nitro-2-furyl)vinyl]-4-formylthiazole, and the like.

Illustrative of the compounds represented by Formula V wherein Q is a quaternary ammonium methyl halide are:

2-(5-nitro-2-thienyl-4-thiazolylmethylpyridinium chloride,
2-(5-nitro-2-furyl)-4-thiazolylmethyl hexamethylenetetraminium chloride,
2-(5-nitro-2-thienyl)-4-thiazolylmethylpyridinium bromide,
2-[2-(5-nitro-2-furyl)vinyl]-4-hexamethylenetetraminium chloride,
2-[2(5-nitro-2-furyl)vinyl]-4-(pyridinium methyl)-thiazole chloride, and the like.

As previously mentioned, the starting materials employed for the preparation of the novel intermediates and trypanocidally active compounds of the invention are 5-nitro-2-furyl or 5-nitro-2-thienylthioamides. These compounds are prepared by known methods from the corresponding nitriles by the reaction with thioacetamide. For example, 5-nitro-2-cyanofuran is reacted with thioacetamide to yield 5-nitrofuran-2-thiocarboxamide.

The following examples more fully illustrate the present invention.

EXAMPLE 1

5-Nitro-2-thiocarbamylthiophene

Anhydrous hydrogen chloride was passed into 750 ml. of anhydrous dimethylformamide with cooling until the exothermic reaction had ceased, and 92.3 g. (0.6 mole) of 5-nitro-2-cyanothiophene were added at a temperature of 40° C. Thioacetamide, 90 g. (1.2 mole) was added to the above solution with stirring and the reaction mixture was stirred at about 40° C. for 3 hours. The resulting dark solution was poured onto 4 liters of an ice-water mixture and stirred for 30 minutes. The bright orange precipitate which formed was filtered, slurried in water, refiltered and dried to yield 101 g. of 5-nitro-2-thiocarbamyl-thiophene melting at about 185°–190° C.

Elemental analysis for $C_5H_4N_2O_2S_2$:
Calculated: C, 31.90; H, 2.14; N, 14.88
Found: C, 31.80; H, 2.39; N, 14.60

EXAMPLE 2

2-(5-Nitro-2-thienyl)-4-chloromethylthiazole

A suspension of 51.5 g. (0.27 mole) of 5-nitro-2-thiocarbamylthiophene and 69.6 g. (0.55 mole) or 1,3-dichloroacetone in 55 ml. of dioxane was heated at a temperature of about 90° C. for 1.5 hours with stirring. The reaction mixture was then poured into 400 ml. of water and the dark brown solid was filtered and washed with hot water before being dried to yield 68 g. of 2-(5-nitro-2-thienyl)-4-chloromethylthiazole melting at about 154° C.

The above crude product was boiled with 800 ml. of chloroform and separated from some insoluble matter by filtration. The hot filtrate was treated with charcoal, filtered and evaporated until crystallization commenced. After cooling to 0° C., the orange crystalline solid was collected and dried. Yield: 52.6 g.; m.p. about 160° C.

Elemental analysis for $C_8H_5N_2O_2S_2Cl$
Calculated: C, 36.85; H, 1.93; N, 10.75
Found: C, 36.70; H, 2.12; N, 10.71

EXAMPLE 3

2-(5-Nitro-2-thienyl)-4-thiazolylmethyl hexamethylenetetraminium chloride

A solution of 51 g. of 2-(5-nitro-2-thienyl)-4-chloromethylthiazole and 40 g. of hexamine in 400 ml. of chloroform was heated at the reflux temperature with stirring for 20 hours. The reaction mixture was cooled to room temperature and the solid precipitate was filtered, washed with chloroform and dried to yield 75 g. of 2-(5-nitro-2-thienyl)-4-thiazolylmethyl hexamethylene-tetraminium chloride melting at about 210°–215° C. with decomposition.

EXAMPLE 4

2-(5-Nitro-2-thienyl)-4-thiazolylmethylpyridinium chloride

A solution of 13 g. of 2-(5-nitro-2-thienyl)-4g.-chloromethylthiazole in 50 ml. of pyridine was heated with stirring on a steam bath for 2 hours. The reaction mixture was cooled and the crystalline solid precipitate was filtered, washed with chloroform and dried to yield 12.6 g. of 2-(5-nitro-2-thienyl)-4-thiazolyl-methyl pyridinium chloride melting at about 255° C. after recrystallization from ethanol.

Elemental analysis for $C_{13}H_{10}N_3O_2S_2Cl$
Calculated: C, 45.95; H, 2.96; N, 12.37; S, 18.87; Cl, 10.44
Found: C, 45.96; H, 3.21; N, 12.43; S, 19.10; Cl, 10.65

EXAMPLE 5

2-(5-Nitro-2-furyl)-4-thiazolylmethyl hexamethylenetetraminium chloride

To a solution of 65 g. of 1,3-dichloroacetone in 80 ml. of dioxane was added 50 g. of 5-nitro-2thiocarbamylfuran and the suspension was heated at a temperature of about 70°–80° C. for about 90 minutes in an atmosphere of nitrogen. Hydrogen chloride was evolved and the reaction mixture became a dark colored solution. Five hundred milliliters of water were added to the reaction mixture to produce a solid crystalline precipitate. The precipitate was filtered and recrystallized from benzene/ether (b.p. 60°–80°C.) to give 51 g. of 2-(5-nitro-2-furyl)-4-chloromethylthiazole melting at about 128°–130°C.

A solution of 19.3 g. of the above chloromethylthiazole and 14 g. of hexamine in 150 ml. of chloroform was heated at the reflux temperature for 6 hours. The reaction was cooled to room temperature and the solid yellow precipitate was filtered, washed with chloroform and dried to yield 30.3 g. of 2-(5-nitro-2-furyl)-4-thiazolylmethyl hexamethylenetetraminium chloride.

EXAMPLE 6

2-(5-Nitro-2-thienyl)-4-formylthiazole

A solution of 34 g. of 2-(5-nitro-2-thienyl)-4-thiazolyl-methyl pyridinium chloride and 18.7 g. of p-nitroso-N,N-dimethylaniline hydrochloride in 75 ml. of methanol was obtained with warming. The solution was cooled to room temperature and 100 ml. of 2N sodium hydroxide was added slowly. The reaction mixture became dark green initially and then reddish-brown, when a solid crystalline precipitate of N-(p-dimethylaminophenyl)-2-(5-nitro-2-thienyl)-4-thiazolyl nitrone was formed. The resulting suspension was diluted with 300 ml. of water and the nitrone was filtered, washed with water and dried to yield 27.7 g. of product melting at about 218° C.

A suspension of 17.7 g. of the above nitrone in 250 ml. of water containing 50 ml. of concentrated hydrochloric acid was warmed on a hot water bath for about 10 minutes. The color of the reaction mixture, initially reddish-brown, changed to yellow. The yellow suspension was filtered and washed with water before being dried. Recrystallization of the yellow product from dioxane/petroleum ether (b.p. 60°–80°C.) gave 9.5 g. of 2-(5-nitro-2-thienyl)-4-formylthiazole melting at about 171°–172° C.

EXAMPLE 7

2-(5-Nitro-2-thienyl)-4-formylthiazole

A solution of 67 g. of 2-(5-nitro-2-thienyl)-4-thiazolylmethyl hexaminium chloride and 15 g. of hexamine in 350 ml. of 50 percent aqueous acetic acid was heated at the reflux temperature with stirring for 1 hour. During this period, a yellow precipitate formed. To the reaction solution was added 200 ml. of glacial acetic acid and refluxing was continued until the yellow precipitate went into solution. The hot reaction solution was treated with charcoal and was filtered while hot. Sufficient boiling water was added to the hot filtrate to induce crystallization of the reaction product. The diluted filtrate was cooled to 0° C. and the crystalline precipitate was filtered, washed with water and dried to give 24 g. of 2-(5-nitro-2-thienyl)-4-formylthiazole as a yellow powder melting at about 172° C. The product was recrystallized from benzene, melting at 172° C.

Elemental analysis for $C_8H_4N_2O_3S_2$:
Calculated: C, 39.99; H, 1.68; N, 11.66; S, 26,69
Found: C, 40.01; H, 1.82; N, 11.82; S, 26.4

The thiosemicarbazone derivative of the product melted at about 230°C. with decomposition.

EXAMPLE 8

2-(5-Nitro-2-furyl)-4-formylthiazole

Thirty grams of 2-(5-nitro-2-furyl)-4-thiazolylmethyl hexaminium chloride were dissolved in a solution of 150 ml. of glacial acetic acid in 150 ml. of water. Ten grams of hexamine were added and the solution was heated at the reflux temperature for 90 minutes. The reaction solution was then evaporated in vacuo to a volume of about 50 ml. and was diluted with 200 ml. of water. The pale yellow precipitate which formed was filtered and dried to yield 8 g. of 2-(5-nitro-2-furyl)-4-formylthiazole. The product was recrystallized from benzene after treatment with charcoal. Melting point, about 178° C.

Elemental analysis for $C_8H_4N_2O_4S$:
Calculated: C, 42.85; H, 1.80; N, 12.50; S, 14.30
Found: C, 43.02; H, 1.98; N, 12.54; S, 14.20

The product forms a 2,4-dinitrophenylhydrazone derivative melting at about 256°–258°C. with decomposition.

EXAMPLE 9

2-(5-Nitro-2-thienyl)-4-acetylthiazole

A solution of 18.8 g. of 5-nitro-2-thiocarbamylthiophene and 20 g. of 1-bromobutan-2,3-dione in 150 ml. of dioxane was gently warmed with stirring at a temperature of about 50° to 60° C. for 10 minutes. Hydrogen bromide was evolved during the reaction period. The reaction mixture was diluted with 150 ml. of water and the dark precipitate formed thereby was filtered and washed with water.

The crude product was extracted with 500 ml. of boiling benzene and the hot extract was filtered. The filtrate was treated with decolorizing charcoal, filtered and evaporated until crystallization of the product began. A small amount of petroleum ether (b.p. 60°–80 °C.) was added to further aid in the crystallization of the product. On cooling, 12.5 g. of 2-(5-nitro-2-thienyl)-4-acetylthiazole was obtained as an orange crystalline solid melting at about 198° C.

Elemental analysis for $C_9H_6N_2O_3S_2$:
Calculated: C, 42.51; H, 2.38; N, 11.02; S, 25.22
Found: C, 42.47; H, 2.46; N, 10.84; S, 25,01

EXAMPLE 10

2-(5-Nitro-2-thienyl)-4-(morpholinoiminomethyl)thiazole

A solution of 4.8 g. of 2-(5-nitro-2-thienyl)-4-formylthiazole and 2.5 g. of 4-aminomorpholine in 50 ml. of chloroform was boiled for 30 minutes. The solution was then evaporated to two-thirds of its volume and diluted with 20 ml. of petroleum ether (b.p. 60°–80° C.) The solution was cooled to 0° C. and a red crystalline precipitate formed. The precipitate was filtered to yield 5.0 g. of crude product. Recrystallization from chloroform/petroleum ether (b.p. 60°–80° C.) gave purified product, 2-(5-nitro-2-thienyl)-4-(morpholinoiminomethyl)thiazole melting at about 189°–190° C.

Elemental analysis for $C_{12}H_{12}N_4O_3S_2$:
Calculated: C, 44.42; H, 3.73; N, 17.27; S, 19.76
Found: C, 44.19; H, 3.57; N, 17.19; S, 19.50

EXAMPLE 11

2-(5-Nitro-2-thienyl)-4-(1'-morpholinoiminoethyl)thiazole

A solution of 5.1 g. of 2-(5-nitro-2-thienyl)-4-acetylthiazole and 2.2 g. of 4-aminomorpholine in 60 ml. of chloroform was heated at the reflux temperature for 5 hours. The reaction solution was then evaporated until crystallization of the product began, whereupon a small amount of petroleum ether was added. The reaction solution was then cooled to 0°C. and an orange crystalline precipitate was formed. The precipitate was filtered to yield 5.3 g. of 2-(5-nitro-2-thienyl)-4-(1'-morpholinoiminoethyl)thiazole melting at about 184°C.

Elemental analysis for $C_{13}H_{14}N_4O_3S_2$:
Calculated: C, 46.14; H, 4.17; N, 16.56; S, 18.95
Found: C, 45.93; H, 4.21; N, 16.41; S, 18.67

EXAMPLE 12

2-(5-Nitro-2-furyl-4(morpholinoiminomethyl)thiazole

A solution of 4.48 g. of 2-(5-Nitro-2-furyl)-4-formylthiazole and 2.5 g. of 4-aminomorpholine in 30 ml. of chloroform was heated at the reflux temperature for 30 minutes. The volume of the solution was reduced by one-third and an equal volume of petroleum ether (b.p. 60°–80C.) was added to precipitate an orange oil. The oil rapidly crystallized and was filtered. The crystalline orange precipitate was recrystallized from benzene to yield 3.66 g. of 2-(5-Nitro-2-furyl)-4-morpholinoiminomethyl thiazole as orange crystals melting at about 176°–178°g.

Elemental analysis for $C_{12}H_{12}N_4SO_4$:
Calculated: C, 46.74; H, 3.92; N, 18.17; S, 10.40
Found: C, 47.01; H, 3.96; N, 18.15; S, 10.29

EXAMPLE 13

2-(5-Nitro-2-thienyl)-4-formylthiazole N-(2-hydroxyethyl)hydrazone

A solution of 4.0 g. of 2-(5-nitro-2-thienyl-4-formylthiazole and 1.4 g. of 2-hydroxyethylhydrazine in 30 ml. of chloroform was heated at the reflux temperature for 30 minutes. The reaction mixture was evaporated to remove the solvent and the residue was triturated with ether until it solidified. The solid was recrystallized from a mixture of chloroform and petroleum ether (b.p. 40°–60°C.) to yield 3.4 g. of 2-(5-nitro-2-thienyl)-4-formylthiazole N-(2-hydroxyethyl)hydrazone as dark red crystals melting at about 133°C.

EXAMPLE 14

2-(5-Nitro2-thienyl)-4-(2′,6′-dimethylmorpholinoiminomethyl)-thiazole

A solution of 9.6 g. of 2-(5-Nitro-2-thienyl)-4-formyl-thiazole and 5.3 g. of 4-amino-2,6-dimethylmorpholine in 70 ml. of chloroform was heated at the reflux temperature for 45 minutes. The solution was treated with decolorizing charcoal and filtered and the filtrate was evaporated to about one-half the original volume. Petroleum ether (b.p. 60°–80°C) was added until the turbidity point was reached. The solution was then cooled resulting in the formation of a red crystalline precipitate. The precipitate was recrystallized from chloroform/petroleum ether (b.p. 60°–80°C.) to yield 9.5 g. of 2-(5-Nitro-2-thienyl)-4-(2′,6′-dimethylmorpholinoiminomethyl)thiazole melting at about 160°–164°C.

Elemental analysis for $C_{14}H_{16}N_4O_3S_2$:
Calculated: C, 47.71; H, 4.58; N, 15.80; S, 18.80
Found: C, 47.49; H, 4.57; N, 15.66; S, 17.15

EXAMPLE 15

2-[2-(5-Nitro-2-thienyl)vinyl]-4-formylthiazole
Method A

A solution of 2.86 g. of 2-[2-(5-nitro-2-thienyl)vinyl]-4-chloromethylthiazole and 2.0 g. of hexamine in 25 ml. of chloroform was heated at the reflux temperature overnight and the reaction mixture was cooled to room temperature. The precipitate which formed was filtered to yield 3.7 g. of 2-[2-(5-nitro 2-thienylvinyl]-4-thiazolylmethyl hexaminium chloride which was recrystallized from methanol/ether to give a microcrystalline solid melting at about 210°–215°C. (decomp.)

A solution of 16.5 g. of the above-prepared hexaminium chloride and 4.0 g. of hexamine in 125 ml. of 50 percent acetic acid was heated at the reflux temperature for 1 hour. The reaction mixture was cooled and poured into 100 ml. of ice water containing 25 ml. of concentrated hydrochloric acid with the formation of a yellow precipitate. The precipitate was filtered and dried to yield 6 g. of crude product. The crude product was extracted with 250 ml. of boiling dioxane and the extract was filtered and evaporated to yield 4.1 g. of 2-[2-(5-nitro-2-thienyl)-vinyl]-4-formylthiazole as a light yellow crystalline residue. Recrystallization of the residue from chloroform gave the purified aldehyde melting at about 208°–211°C.

Elemental analysis for $C_{10}H_6N_2O_3S_2$:
Calculated: C, 45.15; H, 2.27; N, 10.53; S, 24.11
Found: C, 45.30; H, 2.49; N, 10.46; S, 23.97

Method B

A solution of 4.0 g. of 2-[2-(5-nitro-2-thienyl)vinyl]-4-chloromethylthiazole in 10 ml. of pyridine was heated at a temperature of about 90°C. for 3 hours. When crystallization began to occur, the mixture was cooled and diluted with 50 ml. of ether. The crystalline precipitate was filtered and dried to yield 5.0 g. of 2-[2-(5-nitro-2-thienyl)vinyl]-4-thiazolyl-methyl pyridinium chloride melting at about 245°–250°C. with decomposition. Five grams of the above pyridinium salt was suspended in 100 ml. of ethanol with 2.55 g. of freshly prepared p-nitroso-N,N-dimethylaniline hydrochloride at a temperature of 0° C. To the cold suspension was added dropwise with stirring 21 ml. of 2N sodium hydroxide. After about 2.5 hours the dark brown precipitate which formed was filtered, washed with ethanol and dried to yield 4.1 g. of N-(p-dimethylaminophenyl)-2-[2-(5-nitro-2-thienyl)vinyl]-4-thiazolyl nitrone melting at about 205°–210° C.

The above nitrone intermediate was suspended in 50 ml. of water and 10 ml. of concentrated hydrochloric acid was added to the suspension. After stirring for one quarter hour at room temperature, the yellow solid was filtered. The yellow solid was extracted with 200 ml. of boiling methanol and the extract was treated with charcoal before being filtered to give an orange filtrate. The filtrate was evaporated in vacuo to yield an oil which crystallized on standing to yield 2.1 g. of product, 2-[2-(5-nitro-2-thienyl)vinyl]-4-formylthiazole. The product was purified by recrystallization from isopropanol to afford 1.1 g. melting at about 207°–211° C.

EXAMPLE 16

2-[2-(5-nitro-2-thienyl)vinyl]-4-(morpholinoiminomethyl)thiazole

One gram of 2-[2-(5-nitro-2-thienyl)vinyl]-4-formylthiazole was dissolved in 30 ml. of a 1:1 mixture of dioxane/chloroform at 60° C. and 800 mg. of 4-aminomorpholine was added. After 5 minutes, the red reaction mixture was cooled to 0° C. and 800 mg. of the reaction product, 2-[2-(5-nitro-2-thienyl)vinyl]-4-(morpholinoiminomethyl)thiazole, was precipitated as a red crystalline solid melting at about 210°–214° C. Recrystallization of the product from chloroform/ether gave a purified product melting at about 214°–215° C.

Elemental analysis for $C_{13}H_{13}N_4O_3S_2$
Calculated: C, 48.01; H, 4.0; N, 16.0; S, 18.3
Found: C, 47.7; H, 4.13; N, 15.90; S, 17.90

EXAMPLE 17

2-(5-Nitro-2-thienyl)-4-(piperidinoiminomethyl)thiazole

A solution of 4.8 g. of 2-(5-nitro-2-thienyl)-4-formyl thiazole and 2 g. of 1-aminopiperidine in 30 ml. of chloroform containing a few drops of glacial acetic acid was heated at the reflux temperature for 1 hour. The reaction mixture was cooled to room temperature and was diluted with 2 volumes of diethyl ether to produce a red precipitate. The precipitate was filtered and dried before being crystallized from benzene to yield 5 g. of 2-(5-nitro-2-thienyl)-4-(piperidinoiminomethylthiazole melting at about 194°–195° C.

Elemental analysis for $C_{13}H_{14}N_4O_2S_2$:
Calculated: C, 48.43; H, 4.38; N, 17.38; S, 19.89
Found: C, 48.49; H, 4.35; N, 17.12; S, 19.64

EXAMPLE 18

2-(5-Nitro-2furyl)-4-(piperidinoiminomethyl)thiazole

A solution of 4.48 g. of 2-(5-nitro-2-furyl)-4-formylthiazole and 2.0 g. of 1-aminopiperidine in 30 ml. of chloroform containing a few drops of glacial acetic acid was heated at the reflux temperature for 1 hour. The reaction mixture was cooled to room temperature and diluted with 2 volumes of ether to produce a precipitate. The precipitate was recrystallized from benzene/petroleum ether (b.p. 60°–80°C.) to yield 3.8 g. of 2-(5-nitro-2-furyl)-4-(piperidinoiminomethyl)thiazole melting at about 175° C.

Elemental analysis for $C_{13}H_{14}N_4O_3S$:
Calculated: C, 50.97; H, 4.61; N, 18.29; S, 10.47
Found: C, 50.79; H, 4.35; N, 18.04; S, 10.60

EXAMPLE 19

2-(5-Nitro-2-furyl)-4-(thiomorpholinoiminomethyl)thiazole.

Following the procedure described by Example 16, 4.48 g. of 2-(5-nitro-2-furyl)-4-formylthiazole was reacted with 2.4 g. of 4-aminothiomorpholine to yield 4.8 g. of 2-(5-nitro-2-furyl)-4-(thiomorpholinoiminomethyl)thiazole melting at about 190°C. after recrystallization from benzene.

Elemental analysis for $C_{12}H_{12}N_4O_3S_2$:
Calculated: C, 44.43; H, 3.73; N, 17.27; S, 19.77
Found: C, 44.26; H, 3.50; N, 16.99; S, 19.58

EXAMPLE 20

2-(5-Nitro-2-furyl)-4-(thiomorpholinoiminomethyl)thiazole, 1′,1′-dioxide

Following the procedure described by Example 16, 4.48 g. of 2-(5-nitro-2-furyl)-4-formylthiazole was reacted with 3.8 g. of 4-aminothiomorpholine 1,1-dioxide to yield 4.0 g. of 2-(5-nitro-2-furyl)-4-(thiomorpholinoiminomethyl)thiazole 1′,1′-dioxide melting at about 230° C. after recrystallization from dioxane/petroleum ether (b.p. 60°–80°C.)

Elemental analysis for $C_{12}H_{12}N_4O_5S_2$:
Calculated: C, 40.44; H, 3.40; N, 15.72; S, 17.99
Found: C, 40.47; H, 3.44; N, 15.73; S, 18.05

Similarly the following compounds were prepared:

2-(5-Nitro-2-furyl)-4-(4-methyl-piperazinoiminomethyl)thiazole.

Melting point: 180°C.
| Analysis: | %C | %H | %N | %S |
|---|---|---|---|---|
| Calculated: | 48.58 | 4.71 | 21.79 | 9.98 |
| Found: | 48.77 | 4.83 | 21.52 | 10.28 |

2-(5-Nitro-2-furyl)-4-(4-β-hydroxyethyl-piperazinoiminomethyl) thiazole.

Melting point: 175° C.
| Analysis: | %C | %H | %N | %S |
|---|---|---|---|---|
| Calculated: | 47.85 | 4.88 | 19.93 | 9.13 |
| Found: | 48.07 | 5.00 | 19.68 | 9.28 |

2-(5-Nitro-2-furyl)-4-(homopiperidinoiminomethyl)thiazole.

Melting point: 170–171°C.
| Analysis: | %C | %H | %N | %S |
|---|---|---|---|---|
| Calculated: | 52.48 | 5.03 | 17.49 | 10.01 |
| Found: | 52.39 | 5.01 | 17.23 | 10.21 |

2-(5-Nitro-2-thienyl)-4-thiomorpholinoiminomethyl thiazole.

Melting point: 172 C.

| Analysis: | %C | %H | %N | %S |
|---|---|---|---|---|
| Calculated: | 42.33 | 3.55 | 16.46 | 28.26 |
| Found: | 42.10 | 3.49 | 16.25 | 28.12 |

2-(5-Nitro-2-furyl)-4-(2,6-dimethyl-piperidinoiminomethyl) thiazole.

Melting point: 145 C.
| Analysis: | 11%H | 11%N | 11%S |
|---|---|---|---|
| Calculated: | 53.87 5.42 | 16.76 | 9.59 |
| Found: | 54.04 5.62 | 16.73 | 9.70 |

EXAMPLE 21

2-(5-Nitro-2-furyl)-4-formyl thiazole 2-(5-Nitro-2-furyl-4-chloromethyl thiazole (170.7 g.; 0.7 mole) and anhydrous sodium acetate (205 g.; 2.5 mole) was mixed with dimethyl formamide (700 ml.) and heated with stirring on a steam bath for 3 hours. During this period the internal temperature reached 95 C. The reaction mixture was poured into 2 l. of ice/water slurry and well stirred. The solid precipitate was collected, washed with water and dried. The product was dissolved in 1,200 ml. of boiling benzene and filtered, and the filtrate was treated with charcoal (40 g.). After refiltration the solution was evaporated to dryness, giving 2-(5-nitro-2-furyl)-4-acetoxymethyl thiazole as a yellow-orange crystalline solid which after recrystallization from iso-propanol melted at 143 C: Yield: 157 g.

One hundred and fifty g. (0.56 mole) was then dissolved in 700 ml. dioxan and a mixture of 100 ml. concentrated HCl and 100 ml. water was added. The mixture was boiled for 45 minutes and then evaporated to about 150 ml. One liter of cold water was added and shaken to give a yellow solid product which was collected, washed with water and dried to give 120 g. of 2-(5-nitro-2-furyl)-4-hydroxymethyl thiazole, m.p. 152 C. after recrystallization from an ethyl acetate / 60–80 petroleum ether mixture.

A solution of sodium dichromate dihydrate (41.6 g.; 0.14 mole) in 100 ml. of glacial acetic acid was added dropwise to a solution of the 2-(5-nitro-2-furyl)-4-hydroxymethyl thiazole (90.5 g.; 0.4 mole) in 500 ml. of glacial acetic acid, stirred and maintained at 60 C. After stirring and heating at this temperature for 1 hour more, the solution was poured into 3 l. of ice-water. The solid precipitate was collected, washed with 2 1 l. of water and dried. The solid was extracted with 3 1 l. of boiling benzene and the extracts were treated with charcoal, filtered and evaporated to dryness. Yield: 60.5 g. of 2-(5-nitro-2-furyl)-4-formyl thiazole, m.p. 175–178 C.

We claim:

1. A compound of the formula

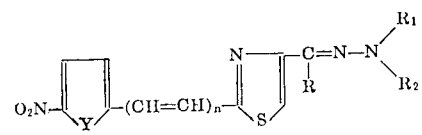

wherein Y is O or S, $n$ is 0 or 1, R is hydrogen or C C alkyl, R and R when taken separately are hydrogen, C–C alkyl, C–C hydroxyalkyl or C–C alkoxyalkyl and R and R when taken together with the nitrogen atom to which they are attached represent a heterocyclic ring selected from the group consisting of pyrrolidino, piperidino, homopiperidino, morpholino, thiamorpholino, thiomorpholino 1,1-dioxide, piperazino, and $C_1$-$C_4$ lower alkyl, $C_1$-$C_4$ lower hydroxyalkyl or hydroxy derivatives thereof.

2. The compound of claim 1 said compound being 2-(5-nitro-2-thienyl)-4-(morpholinoiminomethyl)thiazole.

3. The compound of claim 1 said compound being 2-(5-nitro-2-furyl)-4-(morpholinoiminomethyl)thiazole.

4. The compound of claim 1 said compound being 2-(5-nitrpo-2-furyl)-4-(thiomorpholinoiminomethyl)thiazole.

5. The compound of claim 1 said compound being 2-(5-nitro-2-furyl)-4-(piperidinoiminomethyl)thiazole.

6. The compound of claim 1 said compound being 2-(5-nitro-2-thienyl)-4-(1'-morpholinoiminoethyl)thiazole.

7. A compound of the formula

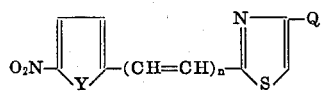

wherein Y is O or S, $n$ is 0 or 1 and Q is $C_1$-$C_7$ alkanoyl or a group of the formula $$-CH_2-[A]^+ X^-$$

wherein A is pyridinium or hexamethylenetetraiminium and X is chloro or bromo.

8. The compound of claim 7 said compound being 2-(5-nitro-2-furyl)-4-formylthiazole.

9. The compound of claim 7 said compound being 2-(5-nitro-2-thienyl)-4-formylthiazole.

10. The compound of claim 7 said compound being 2-[2(5-nitro-2-thienyl)vinyl]-4-formylthiazole.

11. The compound of claim 7 said compound being 2-[2-(5-nitro-2-furyl)vinyl]-4-formylthiazole.

12. The compound of claim 7 wherein Q is a group of the formula $$-CH_2-[A]^+ X^-$$

and $[A]^+$ is hexamethylenetetraiminium and X is chloro.

* * * * *

PO-1050
(5/69)

UNITED STATES PATENT OFFICE
CERTIFICATE OF CORRECTION

Patent No. 3,691,160                    Dated September 12, 1972

Inventor(s) Patrick Roffey and John Pomfret Verge

It is certified that error appears in the above-identified patent and that said Letters Patent are hereby corrected as shown below:

Column 5, line 47, delete "mixture of" and replace with --the--. Column 6, line 55, after "about 90°C." insert the sentence --The reaction mixture is heated for about 90 minutes and then poured into water.-- Column 9, line 13, after "dark" insert --red--; line 63, "-4g.-" to -- -4- --; Column 10, line 23, after "benzene/", insert --petroleum-- to read --benzene/petroleum ether--. Column 11, line 16, insert a decimal in "2669" to read --26.69--. Column 12, line 48, "60°-80C.)" to --60°-80°C.)--; line 53, "176°-178°g." should read --176°-178°C.-- Column 14, line 57, "(piperidinoiminomethylthiazole" should read --(piperidinoiminomethyl)thiazole--. Column 16, line 4, "2-(5-Nitro-2-furyl)-4-(2,6-dimethyl-" should read -- 2-(5-Nitro-2-furyl)-4-(2',6'-dimethyl- --; line 7, "145C." should read --145°C.--; line 7-8, the column headings on the same line as "Analysis:" reading from left to right as follows:
         blank    "11%H    11%N    11%S"
should read -- %C    %H    %N    %S --; line 17, "3" should read --3 1/2--; line 19, "95C." should read --95°C.--; line 20, "2 1." should read --2 1/2 l.--; line 28, "143C:" should read --143°C:--; line 36, "152" should read --152°--; line 43, "60C." should read --60°C.--; line 46, "2 11." should read --2xl1.--; line 47, "3 11." should read --3xl1.--; line 51, "175-178C." should read --175-178°C.--; line 62, "CC" should read --$C_1$-$C_6$--; line 63, "R and R" should read --$R_1$ and $R_2$--; line 64, "C-C", each occurrence, should read --$C_1$-$C_6$--; line 65, "R and R" should read --$R_1$ and $R_2$--. Column 17, line 2, "thiamorpholino," should read --thiomorpholino,--; line 2, "thiomorpholinol 1,1-dioxide" should read --thiomorpholino-1,1-dioxide--.

Signed and sealed this 24th day of September 1974.

(SEAL)
Attest:

McCOY M. GIBSON JR.
Attesting Officer

C. MARSHALL DANN
Commissioner of Patents